Oct. 10, 1950         J. RŮŽIČKA         2,525,375
ARRANGEMENT OF THE FUEL PUMP COOLING IN AIR-COOLED
V-TYPE INTERNAL-COMBUSTION ENGINES
Filed Aug. 29, 1947
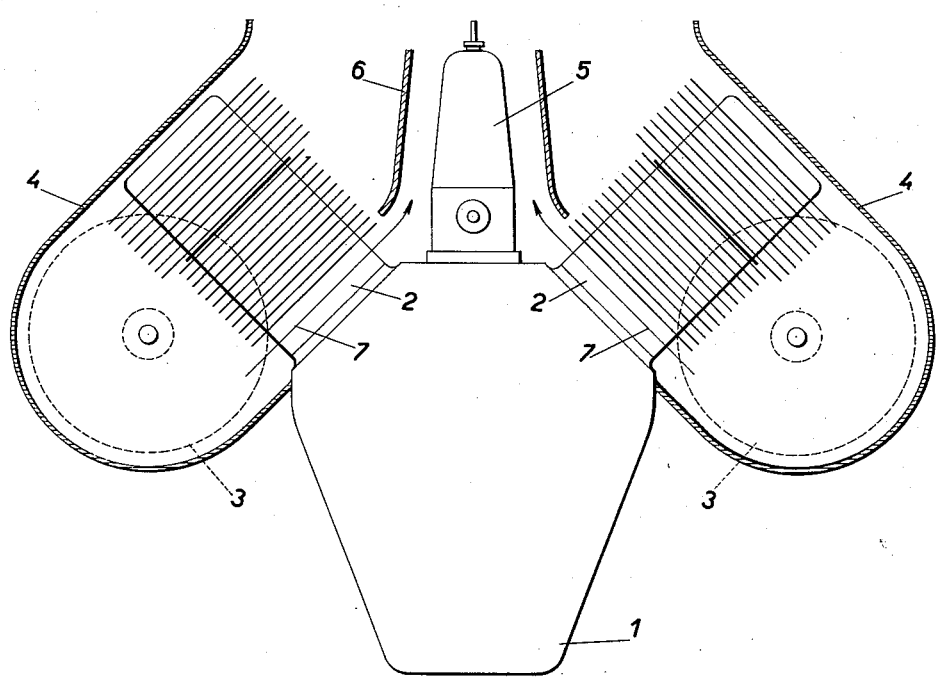

Patented Oct. 10, 1950

2,525,375

UNITED STATES PATENT OFFICE 2,525,375

ARRANGEMENT OF THE FUEL PUMP COOLING IN AIR-COOLED V-TYPE INTERNAL-COMBUSTION ENGINES

Jaroslav Růžička, Prague-Smichov, Czechoslovakia, assignor to Tatra, národní podnik, Koprivnice Application August 29, 1947, Serial No. 771,368
In Germany January 25, 1944

Section 1, Public Law 690, August 8, 1946
Patent expires January 25, 1964

2 Claims. (Cl. 123—171)

In air-cooled internal combustion engines, more particularly Diesel engines with V-cylinders the utilization of the space between the cylinders presents substantial difficulties; it is true that inside this space the fuel distribution may be arranged very preferably, such arrangement, however, presents the drawback that the hot air from the cylinders is passing through this space. This drawback is eliminated in the arrangement according to the present invention, the otherwise preferable arrangement of the fuel pump inside said space being maintained by surrounding said pumps with a shell wherein the air passing by between the cylinders at the bottom end thereof, i. e. on the coolest point of the cylinder, is introduced, so that the air is pre-heated only to a comparatively low degree. Preferably the cylinders are not provided at these points with ribs, in order to keep the cooling air portion passing therethrough at these points in a cool condition.

The accompanying drawing illustrates diagrammatically by way of example an embodiment of the object of the invention.

On the engine casing 1 the blocks of the cylinders 2 are arranged said cylinders being cooled by the air from the fans 3 driving the air into the ducts 4. The fuel pump 5 is sitting on the casing 1 between the blocks of the cylinders and is surrounded by a shell 6 in such manner that the cooling air may penetrate therein from the cylinder bottom in the direction indicated by the arrows 7. In these points no ribs are provided on the cylinders to avoid heating of the air.

I claim:

1. The combination with an air-cooled internal combustion engine having its cylinders arranged in V-formation on a crankcase, of a fuel pump attached to the crankcase and positioned in the space between the cylinders, a shell surrounding said fuel pump in spaced relation and spaced with its lower end from said crankcase, whereby relatively cool air from the lower portion of the cylinders is adapted to enter the lower end of said shell to prevent an overheating of the fuel pump.

2. The combination with an air-cooled internal combustion engine having its cylinders provided with cooling ribs and arranged in V-formation on a crankcase, of means forming ducts about said cylinders, fans positioned laterally on the exterior of the cylinders and directing blasts of cooling air transversely through said ducts, a fuel pump attached to the crankcase and positioned in the space between the cylinders, a shell surrounding said fuel pump in spaced relation and spaced with its lower end from said crankcase, whereby relatively cool air from the lower portion of the cylinder is adapted to enter the lower end of said shell to prevent an overheating of the fuel pump, said cooling ribs extending from the upper end of the cylinders downwardly to the point where the lower end of said shell terminates, so that the air entering said shell has not contacted any cooling ribs.

JAROSLAV RŮŽIČKA.

REFERENCES CITED

The following references are of record in the file of this patent:

UNITED STATES PATENTS

| Number | Name | Date |
| --- | --- | --- |
| 2,076,653 | Ledwinka | Apr. 13, 1937 |
| 2,219,516 | Doman et al. | Oct. 29, 1940 |
| 2,267,423 | Reimspiess | Dec. 23, 1941 |